United States Patent [19]

Sowa et al.

[11] 4,203,094

[45] May 13, 1980

[54] APPARATUS FOR SELECTIVELY DISPLAYING A PLURALITY OF INDICATION PANELS

[75] Inventors: Kunihiro Sowa, Okazaki; Motoharu Esaki, Oobu, both of Japan

[73] Assignee: Nippon Soken, Inc., Nishio, Japan

[21] Appl. No.: 831,291

[22] Filed: Sep. 7, 1977

[30] Foreign Application Priority Data

Sep. 21, 1976 [JP] Japan .......................... 51-126935[U]

[51] Int. Cl.$^2$ ....................... G08B 21/00; B60Q 11/00

[52] U.S. Cl. .................................. 340/378.5; 40/467; 40/472; 340/52 F; 340/520; 340/317; 340/809

[58] Field of Search .................. 340/52 F, 324 B, 317, 340/316, 319, 379, 373, 520, 789, 809, 810, 378.5, 378.6; 116/129 G, 129 H, 252, 253, 298, 299; 40/467, 471, 472, 518

[56] References Cited

U.S. PATENT DOCUMENTS

| | | | |
|---|---|---|---|
| 2,204,868 | 6/1940 | Russell et al. | 40/472 |
| 2,720,137 | 10/1955 | Musebeck et al. | 40/472 |
| 2,736,017 | 2/1956 | Marlowe et al. | 340/324 B |
| 3,916,375 | 10/1975 | Sumiyoshi et al. | 340/52 F |
| 3,987,439 | 10/1976 | Spaniola | 340/52 F |
| 4,001,776 | 1/1977 | Carol et al. | 340/52 F |
| 4,072,924 | 2/1978 | Pomerantz | 340/52 F |
| 4,087,804 | 5/1978 | Zabler et al. | 340/52 F |

*Primary Examiner*—John W. Caldwell, Sr.
*Assistant Examiner*—James J. Groody
*Attorney, Agent, or Firm*—Cushman, Darby & Cushman

[57] ABSTRACT

A plurality of sensors are provided each sensing a different condition occurring in a motor vehicle. Each sensor supplies a signal to a converter which converts the signals into a four-digit binary coded signal. A plurality of condition indicating panels, each bearing up to four projections, sequentially move past a stationary switch arrangement to open at least one of four normally closed switches to produce further binary coded signals. A digital comparator compares the four-digit binary signal from the converter with those developed by the switches. The comparator produces an output to drive an electric motor to continue movement of the indication panels when the compared signals do not coincide. When coincidence occurs, the output from the comparator changes to stop the motor thereby displaying the selected indication panel. When two or more signals from the sensors are applied to the converter, only one signal of highest priority is converted into a four-digit binary signal which is subjected to a comparison in the manner just described.

3 Claims, 3 Drawing Figures

APPARATUS FOR SELECTIVELY DISPLAYING A PLURALITY OF INDICATION PANELS

BACKGROUND OF THE INVENTION

The present invention relates to an apparatus for selectively displaying individual ones of a plurality of items indicative of a sensed condition.

In known apparatus for selectively displaying a plurality of items, a cylindrical drum having the items presented on its surface is rotated. However, apparatus of this type has the disadvantage that as the number of the items is increased, the surface area of the apparatus must be increased or the side of the individual displays reduced.

SUMMARY OF THE INVENTION

The present invention aims to eliminate the disadvantage just mentioned. Thus, an object of the present invention is to provide an apparatus for selectively displaying individual ones of a plurality of items without increasing the surface area of the apparatus by using as a display device an endless belt with a plurality of successively positioned condition indication panels.

DESCRIPTION OF THE PREFERRED EMBODIMENT

Figure 1:
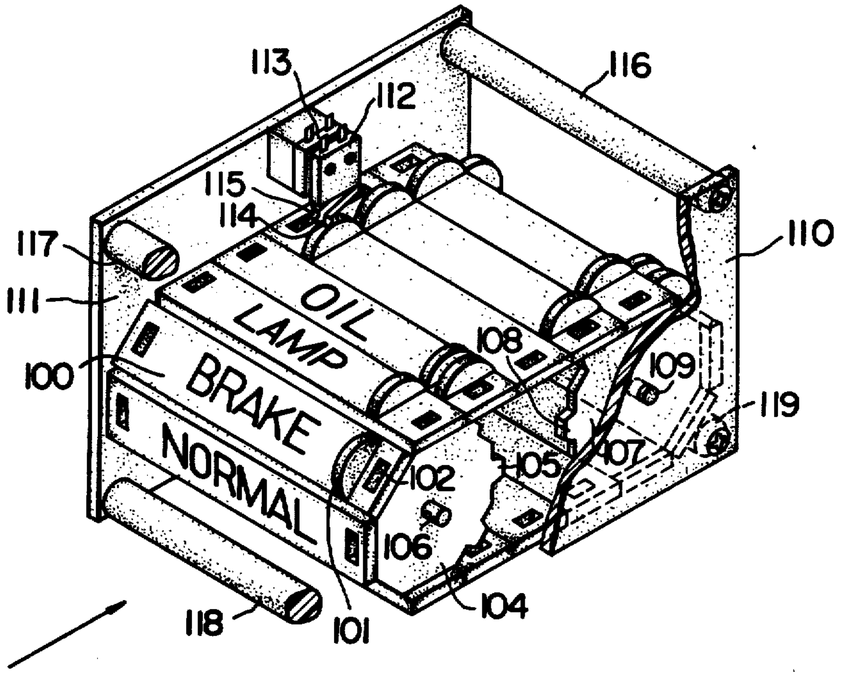
FIG. 1 is a perspective of apparatus arranged according to the present invention.
Figure 2:
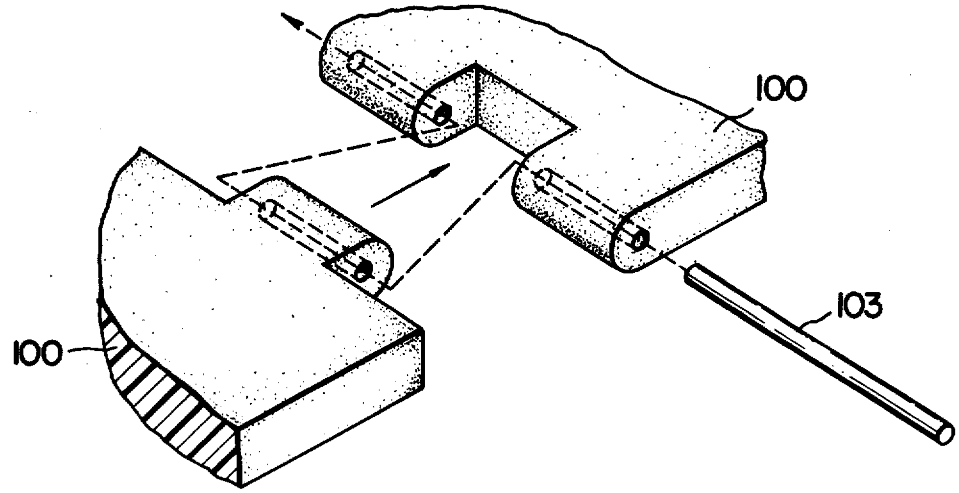
FIG. 2 is a view showing the manner of interconnecting successive indication panels.

The present invention now will be described in detail with respect to the illustrative embodiment shown in the drawings. FIG. 1 depicts an apparatus for in which defects or faults with respect to conditions in a vehicle, such as OIL, LAMP, BRAKE or the like, are detected to drive a motor so that an endless belt is moved which carries indications of the relevant conditions. In FIG. 1, the arrow indicates the front side of the apparatus according to the present invention. Reference numeral 100 designates one of a plurality of indication panels which are interconnected in an endless belt so as to be capable of moving successively and rotatably. In this embodiment, sixteen indication panels 100, each formed of acrylic material, are connected (as shown in FIG. 2) by means of pins 103 so as to form the endless belt. Each indication panel 100 is provided with projections 101 which serve in producing a position discrimination signal in a manner hereinafter to be described. The number of projections employed in the panels ranges from zero to four according to the arrangement of the binary system, whereby each indication panel 100 can be discriminated by a processing circuit which will be described hereinafter with respect to FIG. 3. Each indication panel 100 additionally is provided at opposite ends with feed holes 102 which engage with pawls 105 of sprockets 104 to drive the belt formed by the indication panels 100. A shaft 106 extends between and is fixed to the sprockets 104 so as to drive the belt by rotation of a motor or the like (not shown) which is joined to the shaft. A pair of sprockets 107 and associated pawls 108 are the same as the sprockets 104 and the pawls 105, respectively, except that the former are adapted to idle at opposite ends of a shaft 109 such that they serve only to support the belt. Microswitches are mounted on side plates 110 and 111 in such a manner that two microswitches 112 and 113 are on each side wall. The microswitches 112 and 113 are made to be opened as a result of their leaf spring actuators 114 and 115, respectively, being raised by the projections 101 provided on the indication panels 100. The side plates 110 and 111 are fixed with respect to one another by four supporting bars 116, 117, 118 and 119, and the shafts 106 and 109 are rotatably supported by the side plates 110 and 111.

Figure 3:
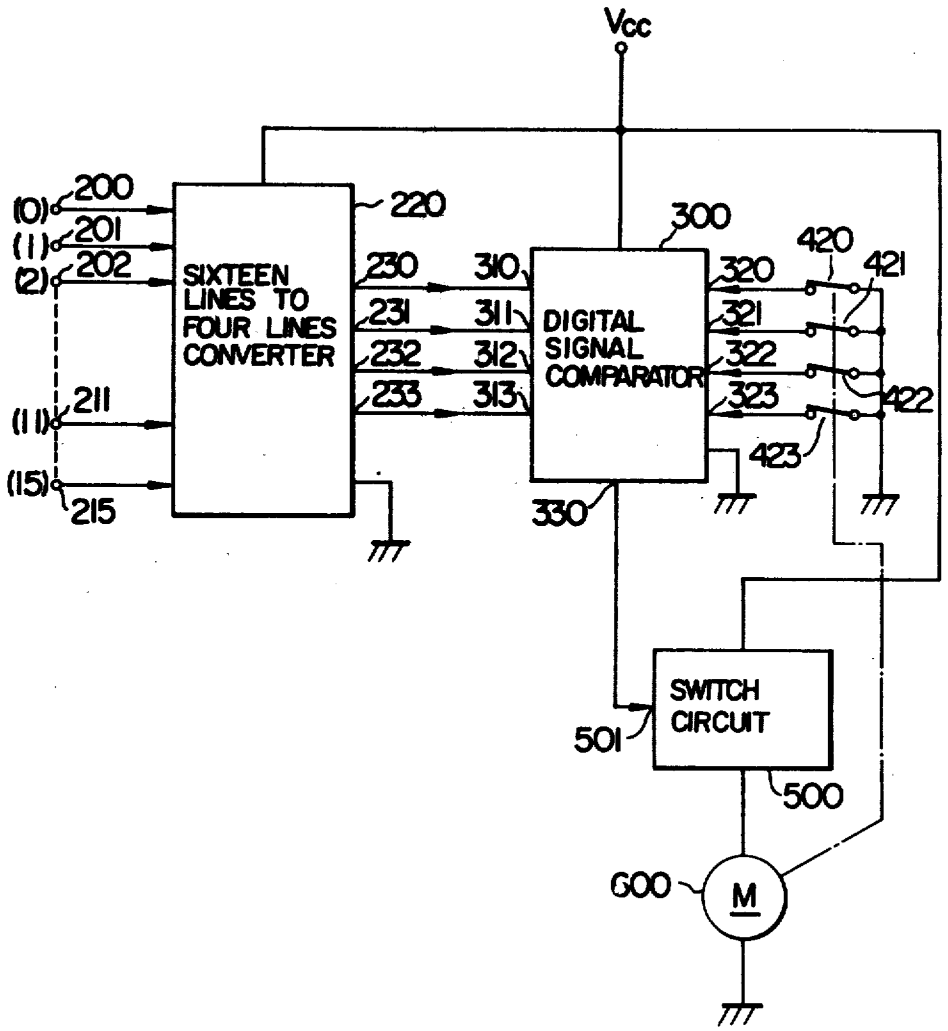
FIG. 3 is a schematic circuit diagram showing the circuit for the driving mechanism of the apparatus according to the present invention.

FIG. 3 is a circuit diagram showing how the endless belt is driven. Reference numerals 200 to 215 are signal input terminals which are supplied externally with condition sensing signals for selecting an indication panel, the terminals being designated address (0) to address (15), respectively in correspondence with the sixteen indication panels 100. Numeral 220 is a sixteen line to four lines converter. The converter 220 is constituted such that a binary number of four figures, corresponding to the address of an input signal terminal 200 to 215 to which a condition sensing is applied, appears at the output terminals 230 to 233. For example, when a binary number signal (1011) indicative of the address (11) is supplied to the input terminal 211, the output from the output terminals 230 to 233 is "1", "0", "1", and "1", respectively; where "1" and "0" represent a source potential and ground potential, respectively. The converter 220 has a further function of judging priority whereby, when more than two signals are supplied to the input terminals 200 to 215, a binary number output signal corresponding to the highest rank appears at the output terminals 230 to 233. Numeral 300 is a digital signal comparator which supplies at its output line 330*a* "1" when signals at its input terminals 310 to 313 and signals at its additional input terminals 320 to 323 coincide. The comparator produces a "0" at output 330 when the inputs differ. Numerals 420 to 423 are four contacts which are included in respective ones of the microswitches 112 and 113 incorporated in the apparatus of FIG. 1. The input terminals 320 to 323 are supplied with "1"s when the respective contacts 420 to 423 are opened with "0" s when they are closed. Numeral 500 designates a switch circuit which is controlled with respect to its opening and closing by an input signal to its control terminal 501 which is obtained from the output line 330 of comparator 300. Switch 500 is opened for the input "1" and closed for the input "0". Numeral 600 is a drive motor which is adapted to be driven by the voltage $V_{cc}$ only when the switch circuit 500 is closed. The rotation of motor 600 is transmitted through a suitable reduction gear device (not shown) to the shaft 106 shown in FIG. 1.

In the above-described arrangement, when the two sets of inputs to the digital comparator 300 are not equal, the output 330 is "0" thus causing the switch 500 to be closed and motor 600 to be rotated. The rotation of motor 600 is transmitted through the reduction gear device to the shaft 106 shown in FIG. 1. Consequently, the sprocket 104 is rotated to drive the belt formed by the interconnected indication panels 100.

A typical cycle of operation now will be described using as an example the situation wherein a defect or fault of a condition is sensed and a resultant signal is supplied to the address (0) of the selection signal input terminals 200 to 215 (that is, to the input terminal 200 of the converter 220). In such a case, all of the output terminals 230 to 233 of the converter supply "0"s to the inputs 310 to 313 of the digital signal comparator 300. The motor 600 will continue to rotate until the other inputs 320 to 323 to comparator 300 are all made to be "0". The state of each of the inputs 320 to 323 is determined by which of the contacts 420 to 423 of the microswitch are closed. Whether the indication panel 100 has projections 101 or not determines whether the contacts 420 to 423 are opened or closed. Thus, when an indication panel 100 having no projections 101 reaches the positions of the actuators 114 and 115 of the microswitches 112 and 113 shown in FIG. 1 and of the actuators (not shown) at the opposite side plate 110, the inputs 320 to 323 to the digital comparator 300 are "0"s, that is, the same as the inputs 310 to 313, so that the output 330 becomes "1" and the switch circuit 500 is opened to stop the motor 600. If the sensed condition corresponding to the input address (0) is identified on the indication panel 100 located on the front side of the apparatus, there is provided a display of the sensed condition which is operationally related to the input address (0). Similarly, when a selection signal is supplied to another address of the selection signal input terminals 200 to 215, the belt will be stopped as the indication panel 100 having the arrangement of projection 101 corresponding to the binary converted input address reaches the position of the actuators 112 and 113 of the microswitches inasmuch as the projections 101 are mounted on the respective indication panels 100 at the locations corresponding to the binary numbers (0) to (15). Thus, the sixteen indication panels corresponding to the respective inputs can be selectively displayed.

A priority system is incorporated in the arrangement just described to handle situations wherein inputs simultaneously are applied to more than one of the input terminals 200 to 215. For example, when both the terminal 200 corresponding to the address (0) and the terminal 211 corresponding to the address (11) are supplied with signals, the indication panel corresponding to the address (0) will be selectively displayed just as described above if the address corresponding to the lower numerical value is set as the address of higher rank.

In the preferred embodiment, the indication panels 100 are formed of acrylic material. However, the same effect can be produced by using other plastic materials or metals.

Furthermore, instead of connecting the indication panels 100 by means of holes formed in the panels for receiving the pins 103, the same effect could be produced by using thin plates wound loosely together, with or without pins, or also by adhering indication sheets on an endless belt of flexible film.

Instead of sixteen indication panels 100 in this embodiment, any number of panels 100 more than eight could be selected by suitably choosing the shape of the sprocket 104.

Although in the embodiment described above, the position detection of the indication panels forming the belt is performed by means of the projections 101 mounted on the panels 100 engaging the microswitches 112 and 113, the same effect could be obtained by forming grooves or holes in the panels, instead of the projections 101. Furthermore, the same effect could be obtained by using conventional switch mechanisms other than the microswitches 112 and 113 but having the same function. As another alternative, instead of employing the projections 101 and the microswitches 112 and 113, the same effect could be obtained by using the combination of optical marks printed on the panels and photoelectric devices, such as phototransistors or the like, or by employing the combination of magnets and reed switches or the like.

As described above, the present invention has the advantage that the number of indication panels capable of being displayed can be increased without considerably increasing the area of the indicators and the volume of the apparatus by arranging the indication panels as an endless belt, with each indication panel being successively engaged.

We claim:

1. An apparatus for selectively displaying a plurality of indication panels, comprising:

a pair of spaced side walls;

first and second rotatable assemblies positioned in spaced parallel relationship and rotatably supported by said side walls;

means for detachably interconnecting said indication panels in an endless belt supported by said rotatable assemblies;

an electric motor coupled to said first rotatable assembly for rotating said first assembly to thereby move the endless belt with respect to the first and second rotatable assemblies; and motor control means connected to said electric motor for controlling the rotation of said motor, said control means including:

a plurality of input terminals corresponding in number to the number of indication panels;

converter means connected to said input terminals and responsive to a signal on at least one of said terminals to produce a binary coded output representative of the input terminal to which said signal is applied;

means associated with each of said panels for providing panel identification;

means for sequentially sensing the identification means of each panel during movement of the endless belt and developing binary coded signals in response to the sensing;

means for comparing said binary coded output with the binary coded signals developed by said sensing means to produce a motor controlling output from said comparing means, and means for connecting the motor controlling output to said electric motor whereby when there is coincidence between a binary coded output and a binary coded signal, said motor is stopped permitting an indication panel to be displayed.

2. An apparatus according to claim 1, wherein each of said indication panels is provided with a hole at opposite ends thereof, and each of said first and second rotatable assemblies is provided with a pair of sprockets having pawls engageable with said holes.

3. An apparatus according to claim 2, wherein said means for providing panel identification comprises a different array of projections on each panel, and wherein said sensing means includes a plurality of switch contacts which are actuated by said projections on said indication panels.

* * * * *